United States Patent [19]

Erni

[11] 4,010,456

[45] Mar. 1, 1977

[54] LOW BATTERY VOLTAGE INDICATOR FOR A PORTABLE DIGITAL ELECTRONIC INSTRUMENT

[75] Inventor: Ernst R. Erni, Portola Valley, Calif.

[73] Assignee: Hewlett-Packard Company, Palo Alto, Calif.

[22] Filed: Mar. 10, 1975

[21] Appl. No.: 556,753

[52] U.S. Cl. .......................... 340/248 B; 340/249; 340/336

[51] Int. Cl.² .......................................... G09F 9/32

[58] Field of Search .......... 340/248 B, 249, 324 R, 340/324 M, 336, 253 B

[56] References Cited

UNITED STATES PATENTS

| | | | |
|---|---|---|---|
| 3,526,887 | 9/1970 | Erni | 340/324 R |
| 3,755,806 | 8/1973 | Bunting | 340/324 R |
| 3,864,677 | 2/1975 | Bekki et al. | 340/253 B |
| 3,882,481 | 5/1975 | Turner | 340/248 B |
| 3,898,790 | 8/1975 | Takamune et al. | 340/248 B |

*Primary Examiner*—Marshall M. Curtis
*Attorney, Agent, or Firm*—Allston L. Jones

[57] ABSTRACT

The output voltage of a battery in a portable digital electronic instrument is compared with an internal voltage reference. When the battery voltage falls below the reference voltage, the true decimal point of the number being displayed is not illuminated and a plurality of the adjacent decimal points are illuminated.

1 Claim, 2 Drawing Figures

LOW BATTERY VOLTAGE INDICATOR FOR A PORTABLE DIGITAL ELECTRONIC INSTRUMENT

BACKGROUND AND SUMMARY OF THE INVENTION

In any battery-operated instrument such as a portable electronic calculator, it is desirable to know when the battery voltage falls to a level at which the circuitry will no longer operate properly. In the past there have been four common methods of low battery indication. The first is to use the instrument itself as an indicator - when the battery gets too low the instrument simply stops working. This method has the obvious disadvantage that it gives the operator no warning of impending battery failure. The second is to provide a low battery indicator, such as a meter, with a switch which the operator occasionally actuates to test the battery. The disadvantage of this method is that it is no better than the first unless the operator remembers to actuate the switch periodically. The third method is to provide a dedicated low battery indicator with its own test circuitry. When the battery is low the indicator automatically gives an indication. The disadvantage of this method as well as the second method is the added components necessary to provide an indicator and associated drive circuitry. In most portable instruments, panel and internal space are at a premium and added components are therefore undesirable. The fourth method, used in some hand held calculators, is to simultaneously illuminate a plurality of the decimal points in the display to indicate a low battery voltage condition. The disadvantage of this method is that the true position of the decimal point in the result being displayed is lost unless the true decimal point is displayed in an appropriate display position without simultaneously displaying a numeral in the same display position, i.e. the true decimal point requires a separate display position.

The present invention uses a digital display circuit in the instrument without requiring a separate display position for the decimal point. The low battery indication is obtained by connecting the output of a comparator to an exclusive OR gate that is serially connected to the instrument digital display circuitry. When the comparator gives a low voltage signal to the display circuitry, the true decimal point of the number being displayed is extinguished and a plurality of the adjacent decimal points are illuminated simultaneously to indicate a low battery condition. Thus, the low battery condition is indicated automatically without using a separate annunciator and while maintaining as compact a display as possible.

DESCRIPTION OF THE PREFERRED EMBODIMENT

Figure 1:
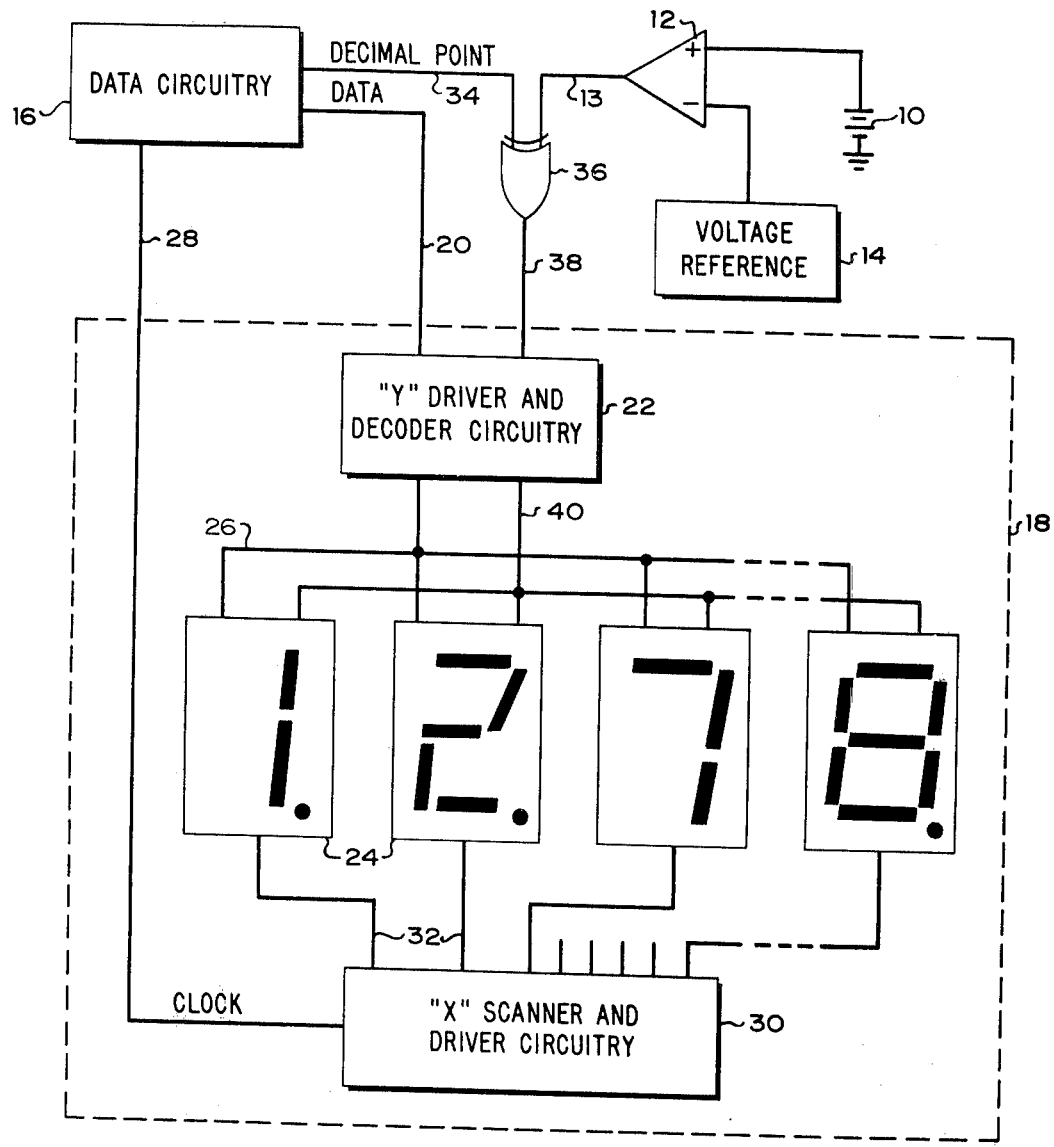
FIG. 1 shows a schematic block diagram of a preferred embodiment of the invention with a low battery indication.

A battery 10 for a portable digital electronic instrument is shown connected to one input of a comparator 12, such as a differential amplifier. In such an instrument the battery is also connected to other circuitry for supplying power thereto; however, such connections to other circuitry have been omitted here for the sake of clarity. A voltage reference 14 is connected to a second input of comparator 12. When the voltage on battery 10 falls below the reference voltage level, comparator 12 will give an output indication such as a logically high signal on output 13.

Data circuitry 16, such as the computational circuit of an electronic calculator, is connected to display circuitry 18 of the instrument. Data lines 20, usually composed of a plurality of individual wires, carry numerical information in coded form. Display circuitry 18 is illustrated as a strobed display although other forms of digital display could be used. Data to be displayed is transmitted serially to a "Y" driver and decoder 22 from data circuitry 16. "Y" driver and decoder 22 signals the appropriate inputs 26 of each digit display module 24. Digit display module 24 may be a 7 segment bar-type display matrix, for example, in which case inputs 26 would be the diode anodes. The data circuitry clock is connected via line 28 to "X" scanner and driver 30. "X" scanner and driver 30 signals one digit display module 24 at a time over lines 32 to light those diodes that have been signaled by "Y" driver and decoder 22. In the case of a light emitting diode matrix, lines 32 would be connected to the diode cathodes.

Each digit display module 24 has a decimal point 25 which may be a single light emitting diode and is positioned outside the area circumscribed by the numeric character display segments. The decimal point information from data circuitry 16 will often be on a separate line 34. Lines 13 and 34 are connected to an exclusive OR gate 36, which in turn is connected to the decimal point input 38 of "Y" driver and decoder 22. As with the numerals, the decimal points are signaled in parallel on line 40. Usually, of course, only one decimal point 25 at a time is lit since the signal on line 34 will correspond with a particular clock pulse on line 28. An example of a normal display is 1 3 6 7 5. 7 8 5. However, when comparator 12 gives a low battery indication, there will be a continuous signal on line 13. Thus, with each clock pulse each successive decimal point 25 will be illuminated except for the true decimal point in the number being displayed, thereby maintaining an indication of the true decimal point of the number without requiring a separate digit display module 24 for the true decimal point. The display of the above example then becomes 1. 3. 6. 7. 5 7. 8. 5., including the low battery indication. This indication might also be described as an "inversion" of the decimal points in the number being displayed.

Line 13 can be connected to any group of decimal point lines if it is desired to light less than all of the decimal points. Also, the decimal point information may be part of the coded information on line 20, instead of being on a separate line 34. Since "Y" driver and decoder 22 is often an integrated circuit, exclusive OR gate 36 and comparator 12 can be integrated into the same chip, saving space in the instrument. An example of the detailed circuits comprising display circuitry 18 is shown in Hewlett-Packard Application Note 931, "Solid State Alphanumeric Display Decoder/Driver Circuitry." It should be noted that other types of digital display modules could be used in place of the 7 segment bar-type display matrix, such as a 5 × 7 light emitting diode matrix or a liquid crystal display.

In the preferred type of digit display module 24, the decimal point is lit together with a multiplicity of the numeral segments on one digit display module 24 forming a number, thus allowing the display of an additional digit with the same number of digit display modules 24. When the present invention is used with such a display, that single true decimal point will be extinguished while the additional decimal points will be displayed. Thus the low battery signal will not effect any information already displayed.

Figure 2:
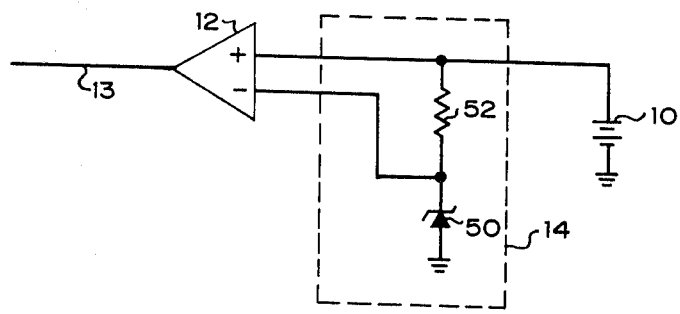
FIG. 2 shows an example of a voltage reference for the circuit of FIG. 1.

FIG. 2 shows an example of a voltage reference 14. A Zener diode 50 is connected to the reference input of comparator 12 and a resistor 52 supplies current to diode 50 from battery 10. The comparator is adjusted to have a voltage offset between inputs to allow for a voltage drop across resistor 50 and to establish the value at which low battery is sensed. Diode 50 may be replaced by the base-emitter drop of one or more transistors in other circuitry within the instrument. Battery voltage also may be sensed at some point in the circuit where the voltage has been dropped resistively to a level nominally equal to the reference voltage.

I claim:
1. A digital electronic instrument comprising:
    a battery;
    digital circuit means responsive to an input stimulus, said digital circuit means having a digital output;
    a digital display including a plurality of display modules responsive to the output of the digital circuit means, each display module having a plurality of light emitting segments for selectively displaying numerals and a decimal point, said decimal point being normally displayed in combination with a numeral on the same display module of the digital display;
    a reference voltage supply; and
    a comparator having a first input connected to the reference voltage supply, a second input connected to the battery, and an output for giving an output signal when the battery voltage is below the reference voltage, the output being connected to the digital display circuit means for causing the true decimal point to be extinguished and a plurality of the adjacent decimal points to be illuminated in response to an output signal from the comparator.

* * * * *